UNITED STATES PATENT OFFICE.

MAX ENGELMANN, OF ELBERFELD, GERMANY, ASSIGNOR TO SYNTHETIC PATENTS CO. INC., OF NEW YORK, N. Y., A CORPORATION OF NEW YORK.

ESTERS OF CARBOXYLARYLPHOSPHORIC ACIDS.

1,125,081.     Specification of Letters Patent.     Patented Jan. 19, 1915.

No Drawing.     Application filed May 12, 1914. Serial No. 838,112.

*To all whom it may concern:*

Be it known that I, MAX ENGELMANN, doctor of philosophy, chemist, citizen of the German Empire, residing at Elberfeld, Germany, have invented new and useful Improvements in Esters of Carboxylarylphosphoric Acids, of which the following is a specification.

I have found that esters of carboxylarylphosphoric acids, such as:

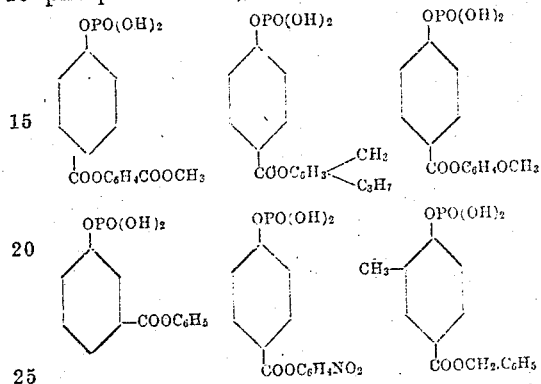

etc., have proved to be valuable remedies against infectious diseases. These esters have the following general formula:

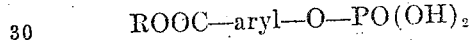

where R is the aryl or other ester-forming group, *e. g.* phenyl, nitro-phenyl, methoxyphenyl, benzyl, guaiacyl, etc. When made from para-oxybenzoic acid derivatives they have the following general formula:

where R has the same meaning as in the preceding formula. The new esters are generally crystalline colorless products, soluble in alcohol and ether and difficultly soluble in water but forming metal salts, such as salts of potassium, sodium, calcium, copper, silver, etc., which are generally soluble in water.

My new products can be obtained in the following way: By the action of phosphorus halogenids upon aromatic oxyacids halogen-carboxylarylphosphoric acid halids are obtained *e. g.* from para-oxybenzoic acid and phosphorus pentachlorid the product:

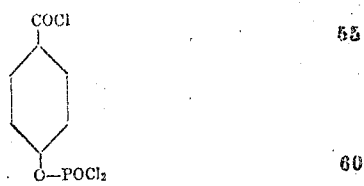

By the action of these halogenids upon alcohols, phenols, phenolalcohols, oxyacids, etc., the new compounds are obtained.

In order to illustrate the new process more fully the following example is given, the parts being by weight:—124 parts of guaiacol are dissolved in 500 parts of benzene, 280 parts of the chlorid of chlorocarboxylphenylphosphoric acid (*Beilstein* Vol. II, page 1528) and 124 parts of dimethylanilin are gradually added to this solution at a temperature of from 30 to 40°. After the reaction mass has been allowed to stand for 24 hours the benzene is distilled off; soda lye and water are added to the oily residue until a strong alkaline reaction and the dimethylanilin is removed with ether. The solution treated with ether is then very strongly acidulated with diluted sulfuric acid and the para-guaiacol-carboxylphenylphosphoric acid which separates hereby in a crystalline shape is filtered off and purified by a crystallization from dilute alcohol. It crystallizes in needles melting at 182° C. and is soluble in alcohol and water. The acid is precipitated from aqueous solutions by the addition of hydrochloric acid. This product has in the shape of its disodium salt which is easily soluble in water most probably the following formula:

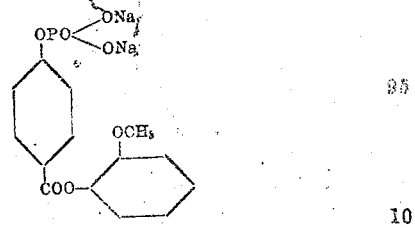

In an analogous manner other of the above mentioned esters are obtained *e. g.* the isocresolester of para-carboxylphenylphosphoric acid melting at 179° C.; the thymolester of para-carboxylphenylphosphoric acid melting at 163° C.

I claim:

1. The new esters derived from the carboxylarylphosphoric acids which are generally crystalline, odorless products soluble in alcohol and difficultly soluble in water but forming metal salts which are mostly soluble in water and being valuable therapeutics against infectious diseases, substantially as described.

2. The new esters of carboxylarylphosphoric acids of the following general formula:

$$ROOC-aryl-O-PO(OH)_2$$

where R is an aromatic ester-forming group, which esters are generally crystalline products soluble in alcohol and difficultly soluble in water but forming metal salts which are mostly soluble in water and which are valuable therapeutics against infectious diseases, substantially as described.

3. The new esters of carboxylarylphosphoric acids of the following general formula:

where R is an aromatic ester-forming group, which esters are generally crystalline products soluble in alcohol and difficultly soluble in water but forming metal salts which are mostly soluble in water and which are valuable therapeutics against infectious diseases, substantially as described.

4. The new guaiacol ester of the carboxylphenylphosphoric acid having most probably in the shape of its sodium salt the formula:

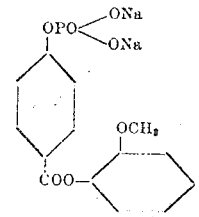

which crystallizes in needles melting at 182° C., soluble in alcohol and difficultly soluble in water but easily soluble in water in the shape of its disodium salt and being a valuable remedy against infectious diseases, substantially as described.

In testimony whereof I have hereunto set my hand in the presence of two subscribing witnesses.

MAX ENGELMANN. [L.S.]

Witnesses:
 HELEN NUFER,
 FRANCES NUFER.